J. P. HYDE.
WATER-CLOSET VALVE.
No. 171,514. Patented Dec. 28, 1875.
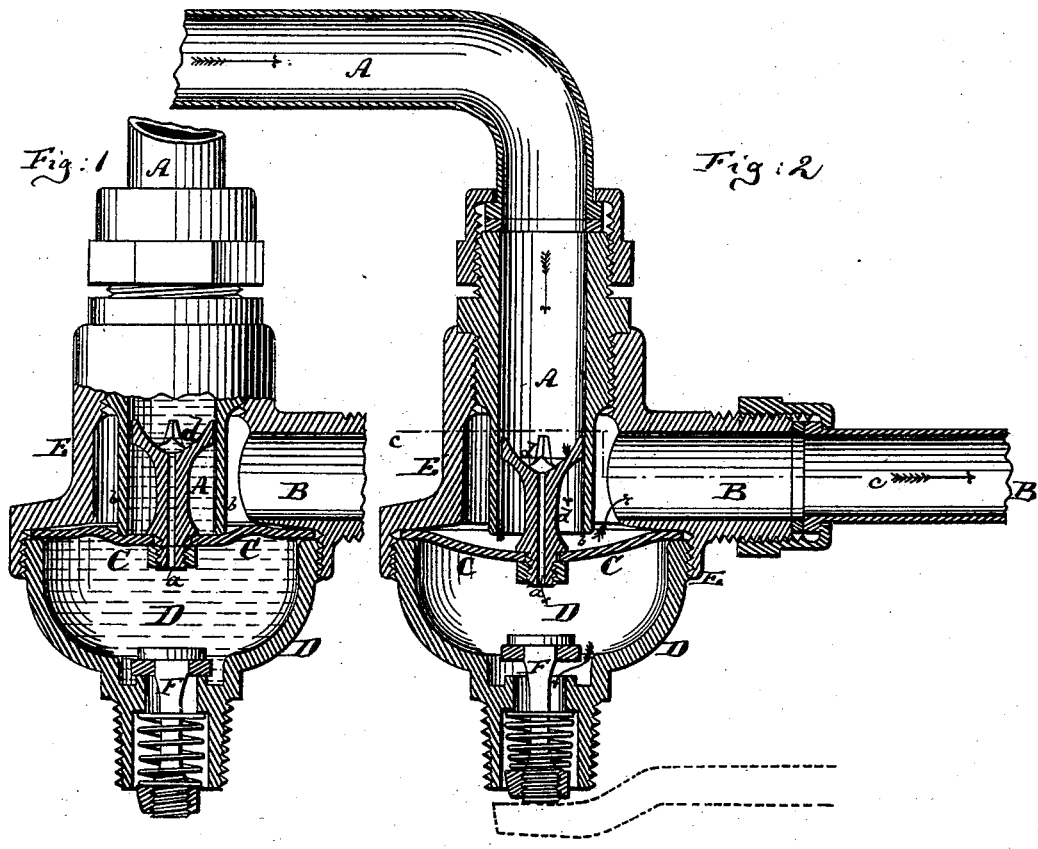
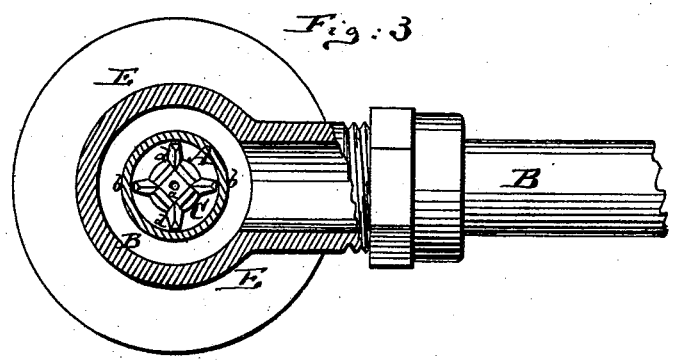
Witnesses:
A. Moraga
Ernest C. Webb
Inventor:
James P. Hyde
by his attorney
A. v. Briesen

UNITED STATES PATENT OFFICE.

JAMES P. HYDE, OF NEW YORK, N. Y., ASSIGNOR TO McNAB AND HARLIN MANUFACTURING COMPANY, OF SAME PLACE.

IMPROVEMENT IN WATER-CLOSET VALVES.

Specification forming part of Letters Patent No. 171,514, dated December 28, 1875; application filed December 2, 1875.

*To all whom it may concern:*

Be it known that I, JAMES P. HYDE, of the city, county, and State of New York, have invented a new and Improved Water-Closet Valve, of which the following is a specification:

Figure 1 is a vertical central section of my improved water-closet valve, showing it closed. Fig. 2 is a similar view thereof, showing it opened. Fig. 3 is a horizontal section of the same on the line $c\ c$, Fig. 2.

Similar letters of reference indicate corresponding parts in all the figures.

This invention has for its object to produce a valve for water-closets or other similar purposes, which will allow an ample flow of water into the basin, and yet constitute an absolute check against waste, and which, if there is no water in the pipe at the time the valve is opened, will not shut until the desired flow shall have taken place in the prescribed quantity.

The invention consists, principally, in the arrangement of a valve which is opened by the pressure of the water against its face, and shut by counter pressure of water, all as hereinafter more fully described. The invention also consists in further details of invention hereinafter more clearly pointed out.

In the accompanying drawing, the letter A represents the water-supply pipe, and B the pipe leading to the water-closet, basin, or other vessel. These two pipes are coupled together in such manner that the water may flow from the pipe A into the pipe B whenever the valve C is open. This valve C is a flexible diaphragm, confined at its edges, and so placed with reference to the pipes A and B that it may serve to close the communication between them, as in Fig. 1. D is a cup or vessel, placed beneath the valve C, and screwed or otherwise fastened to the elbow piece or box E, which connects the pipes A and B. The valve C has one or more small apertures, $a$, which serve as communicating-passages between the pipe A and cup D. The lower part of the cup contains a self-closing valve, F, which, when raised by a lever, as in Fig. 2, allows the contents of the cup to flow off through the lower opening in said cup. It should be observed that the last-mentioned opening is much larger than the aperture $a$ of the valve C.

The operation is as follows: The water in the pipe A presses upon the valve C and tends to open it; but some water trickling through the hole $a$ fills the cup D, and sustains the valve against the pressure of the upper column and holds it closed, as in Fig. 1. The valve C in its closed position bears against the partition $b$, that separates the pipes A and B, which partition is shown to be annular, but which may be of any other suitable form, as the pipes A B may be placed side by side vertically or in the same horizontal plane, or otherwise arranged in suitable position.

When a flow of water through the pipe B is desired, it is only necessary to raise the valve F by suitable lever or other mechanism, and thereby to discharge the contents of the cup D, whereupon the pressure of the column of water in the pipe A will prevail and open the valve C, as in Fig. 2. The water can now flow freely into the pipe B, and thence into the basin. As soon as the cup D has been emptied, the valve F should be let down to let the cup D be refilled with the water that trickles through the valve C, and when the said cup is filled the valve C will be closed, as in Fig. 1.

Thus it is that the flow through the pipe B will be continued even after the valve F is closed, and, in fact, as long as the cup D is not entirely filled. A plentiful stream is thus insured and yet all waste avoided, as the flow must certainly cease within a given time after the valve F is reclosed. The larger the hole $a$, the less water will pass through the pipe B after the close of the valve F. If the valve F is opened at a time when there is no water in the pipe A, the cup D will nevertheless be emptied, and the valve C opened and kept open until the cup D is refilled by the subsequent flow of water.

Thus the basin will be washed, although there was no water at hand at the time the valve F was opened; and in this respect my invention is particularly advantageous, as the ordinary water-closet will not be washed if there is no water in the pipe at the time the valve is opened.

The upper central projection $d$, shown on the valve C, in the drawing, is intended as a perforated guide, but may be dispensed with.

The aperture $a$, instead of passing directly through the valve C, may be made in any other part of the apparatus, to connect the pipe A with the cup D.

I claim as my invention—

1. The flexible valve C combined with the pipes A B and with the cup D, which has a discharge-opening below said valve, substantially as herein shown and described.

2. The combination of the valve F with the cup D, valve C, and pipes A and B, substantially as specified.

JAMES P. HYDE.

Witnesses:
 ERNEST C. WEBB,
 OTTO A. WEIDNER.